(12) United States Patent
Shapiro (10) Patent No.: US 7,000,939 B2
(45) Date of Patent: *Feb. 21, 2006

(54) FOLD FLAT JOGGING STROLLERS AND CARGO CARRIERS INCLUDING PIVOTING WHEEL AXLES AND FOLDING SUPPORT FRAMES

(76) Inventor: Richard N. Shapiro, 1668 Dey Cove, Va Beach, VA (US) 23454

( * ) Notice: Subject to any disclaimer, the term of this patent is extended or adjusted under 35 U.S.C. 154(b) by 0 days.

This patent is subject to a terminal disclaimer.

(21) Appl. No.: 10/891,089

(22) Filed: Jul. 15, 2004

(65) Prior Publication Data

US 2004/0251648 A1   Dec. 16, 2004

Related U.S. Application Data

(63) Continuation-in-part of application No. 10/346,112, filed on Jan. 17, 2003, now Pat. No. 6,863,297, which is a continuation-in-part of application No. 10/143,831, filed on May 14, 2002, now abandoned, which is a continuation-in-part of application No. 09/604,769, filed on Jun. 28, 2000, now Pat. No. 6,581,945.

(51) Int. Cl.
   *B62B 7/08* (2006.01)
(52) U.S. Cl. .................. 280/646; 280/642; 280/644; 280/650; 280/658
(58) Field of Classification Search ............. 280/642, 280/643, 644, 650, 30, 47.38, 647, 649, 657, 280/658, 47.4, 33.993, 646, 62
See application file for complete search history.

(56) References Cited

U.S. PATENT DOCUMENTS

| | | | | |
|---|---|---|---|---|
| 1,482,146 A | * | 1/1924 | Pomilio ...................... 280/644 |
| 3,689,099 A | * | 9/1972 | Patterson ...................... 280/38 |
| 4,632,409 A | * | 12/1986 | Hall et al. .................... 280/30 |
| 5,344,171 A | * | 9/1994 | Garforth-Bles .......... 280/415.1 |
| 5,421,597 A | * | 6/1995 | Berner ........................ 280/204 |
| 5,599,033 A | * | 2/1997 | Kolbus et al. .............. 280/204 |
| 5,647,601 A | * | 7/1997 | Potter et al. ............. 280/47.38 |
| 5,887,889 A | * | 3/1999 | Andrus ........................ 280/647 |
| 6,056,306 A | * | 5/2000 | Rust et al. ................... 280/204 |
| 6,220,611 B1 | * | 4/2001 | Shapiro ................... 280/47.34 |
| 6,325,406 B1 | * | 12/2001 | O'Shea et al. ............. 280/642 |
| 6,402,186 B1 | * | 6/2002 | Garland ....................... 280/647 |
| 6,416,077 B1 | * | 7/2002 | Chen et al. ................. 280/642 |
| 6,533,311 B1 | * | 3/2003 | Kaneko et al. ............. 280/647 |
| 6,561,536 B1 | * | 5/2003 | Suzuki ....................... 280/642 |
| 6,581,945 B1 | * | 6/2003 | Shapiro ........................ 280/30 |
| 6,863,297 B1 | * | 3/2005 | Shapiro ....................... 280/646 |
| 2002/0163163 A1 | * | 11/2002 | Shapiro ..................... 280/643 |
| 2003/0102654 A1 | * | 6/2003 | Shapiro ..................... 280/650 |

* cited by examiner

Primary Examiner—J. Allen Shriver (57) ABSTRACT

Fold flat walking or jogging strollers, as well as various fold flat cargo carrier devices are disclosed, which include at least three wheels which may have pivoting wheel support units and alternative foldable support frame embodiments are disclosed. The wheel support units include, in various embodiments, simple manually manipulable methods to latch each wheel in the operative or stowed flat positions, which effectively allows the device to fold to a flat profile without any part or wheel being detached. Associated innovations include a unique forward wheel folding system, a pivoting or floating transverse axle replicating unit ("false axle"), which pivots and latches to replicate a typical fixed wheel axle, but conveniently pivots to a fold flat stowed position. The innovations may also be applied to miscellaneous other types of wheeled carrier devices besides strollers, such as gurneys, golf bag carriers, and hunting game carriers as several examples, and also parking brake and alternative latch release methods are disclosed.

24 Claims, 6 Drawing Sheets

FOLD FLAT JOGGING STROLLERS AND CARGO CARRIERS INCLUDING PIVOTING WHEEL AXLES AND FOLDING SUPPORT FRAMES

This application is a continuation-in-part of U.S. patent application Ser. No. 09/604,769 filed on Jun. 28, 2000, now U.S. Pat. No. 6,581,945, as well as continuation-in-part U.S. patent application Ser. No. 10/143,831 filed on May 14, 2002, voluntarily abandoned; followed by continuation-in-part U.S. patent application Ser. No. 10/346,112, filed on Jan. 17, 2003 now U.S. Pat. No. 6,863,297.

Shapiro's previous U.S. applications include Ser. Nos. 09/271,274 filed on Mar. 17, 1999, now U.S. Pat. No.: 6,220,611, granted Apr. 24, 2001.

FIELD OF INVENTION

The present invention relates to folding, compact walking or jogging stroller devices, generally utilized for transporting children, whether including pneumatic or non-pneumatic tires, as well as cargo carriers of miscellaneous types designed to move cargo and loads. While the preferred embodiments focus on strollers, the inventions are equally applied to wheeled cargo carriers, including, but not limited to cargo carriers, golf bag carts, gurneys, hunting/game carriers, as several examples. This continuation application covers pivoting and stowable wheel axles on additional frame systems which may fold in various manners, alternative latch release methods for the "false axle" innovations, and an alternative "parking" brake embodiment, as well as other innovations which become apparent from the application.

BACKGROUND OF THE INVENTION

In continuation-in-part U.S. application Ser. No.: 09/604,769, filed on Jun. 28, 2000, and the series of continuation applications, applicant disclosed new and unique methods to fold and stow jogging strollers and cargo carriers, especially providing that no wheel of the device must be detached in order to achieve the stowed condition. Consumers increasingly select products that can fold flat, without the need to separate parts and reconstruct them. In continuation-in-part of U.S. application Ser. No. 10/346,112, filed on Jan. 17, 2003, as well as prior continuation-in-part U.S. application Ser. No. 09/604,769 filed on Jun. 28, 2000, disclosures were made relating to compact, folding walking or jogging strollers and wheeled carrier devices. Innovations in the prior-referenced applications related to the adaptation of pivoting wheel axles and methods for folding the pivoting wheel axles into a plane defined by the side elevational profile of the frame of the device. Other significant innovations related to the manner in which the forward wheel is manipulated and stowed, methods to allow for rotation or fixation of the forward wheel, methods for latching and releasing all pivoting wheel axles in operative and stowed positions, various methods relating to the flexible seat fabric, and innovative "false axle"/transverse axle replicating units, and rear wheel support units. The prior continuation-in-part application filed on Jan. 17, 2003 further expanded on the variations of carrier devices to which the innovations may be applied. This application provides several alternative fold flat wheeled carrier frame concepts, including folding wheeled carrier frames that provide for even more compact, fold flat profiles. Further, innovations relating to alternative latch methods to fold and stow the "false axle" innovation are disclosed, as well as a parking brake innovation applicable to the "false axle" folding methods.

SUMMARY OF THE INVENTION

This application is a continuation-in-part application which provides further refinements relating to: methods to latch and release forward wheel support units into an operative and stowed position on alternative carrier device folding frames, further methods to latch and release the rear wheels, and a "false axle" folding wheel system, methods to provide automatic, reciprocating, or rotational action between various components of the rear wheel axle and frame components, alternative embodiments that provide for automatic folding and pivoting of rear wheels and rear wheel component parts when the user manipulates a portion of the components, and an innovative "parking brake" system.

Further features and advantages of the present invention will be set forth in, or apparent from, the detailed description of preferred embodiments thereof which follows:

BRIEF DESCRIPTION OF THE DRAWING

FIG. 7-A is a broken-away perspective of the parking brake mechanism shown in FIG. 7;

DESCRIPTION OF THE PREFERRED EMBODIMENT

Figure 1:
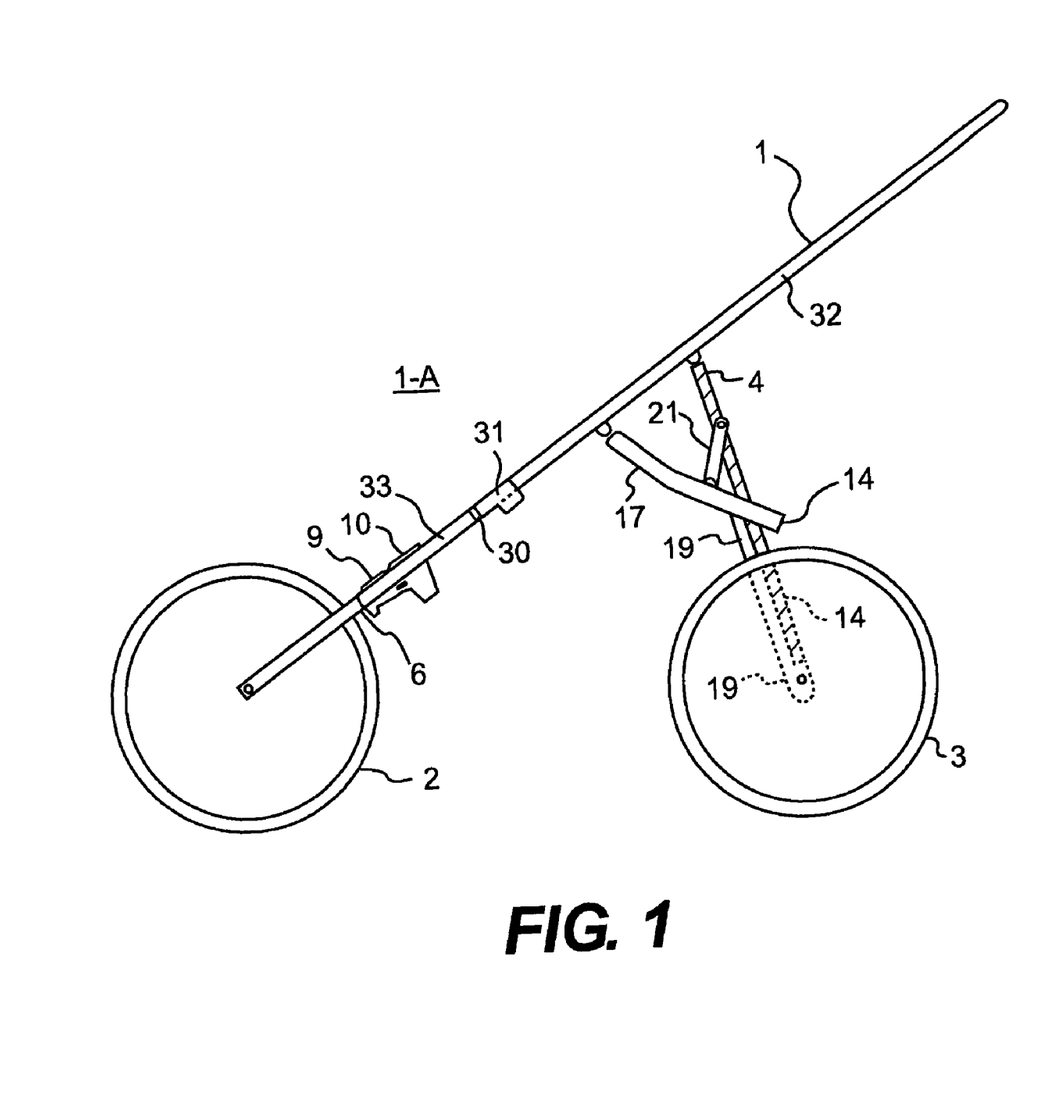
FIG. 1 is a side elevational view of the device 1-A.
Figure 2:
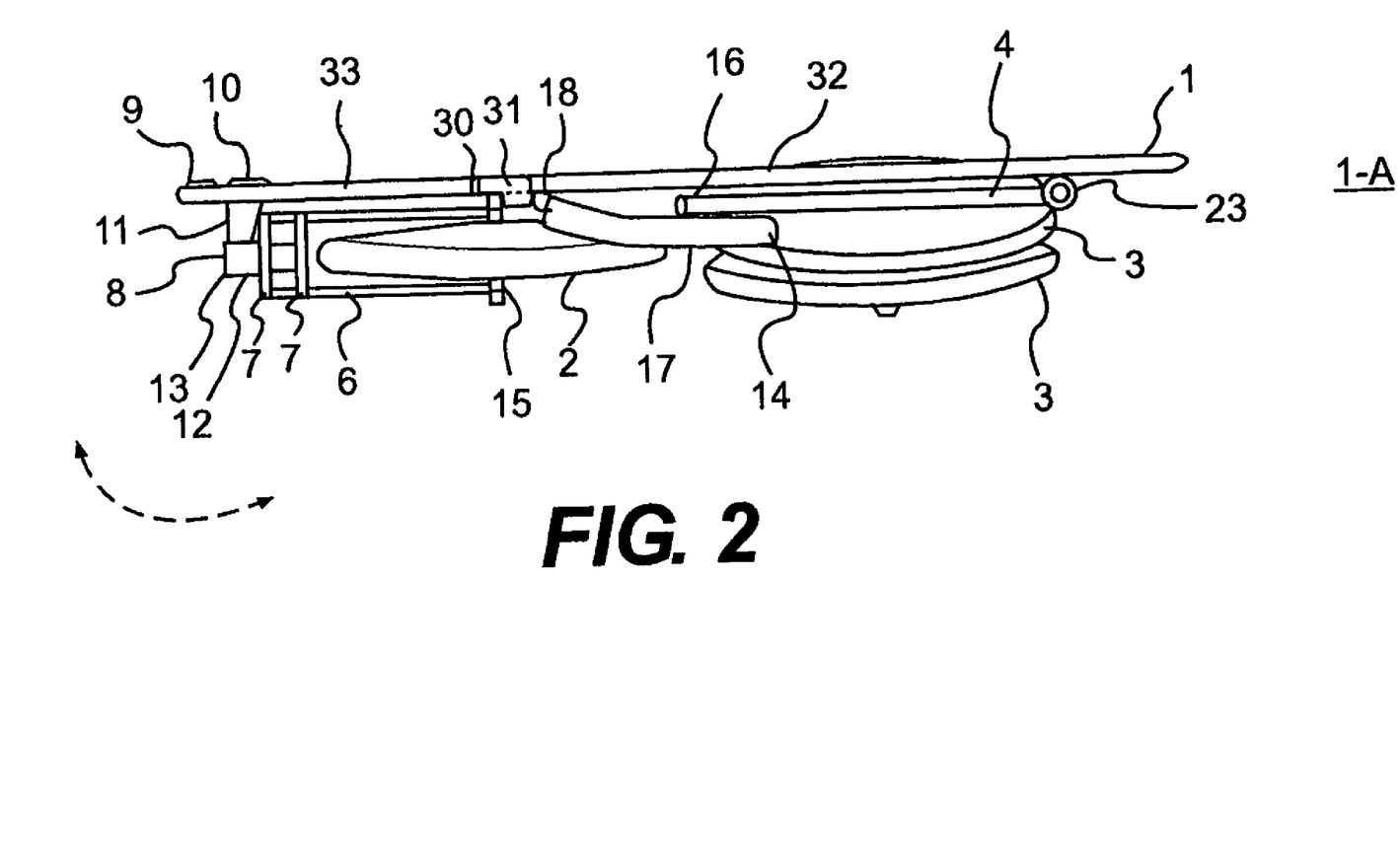
FIG. 2 is a side elevational perspective with the forward wheel and rear wheels in a completely stowed position.
Figure 3:
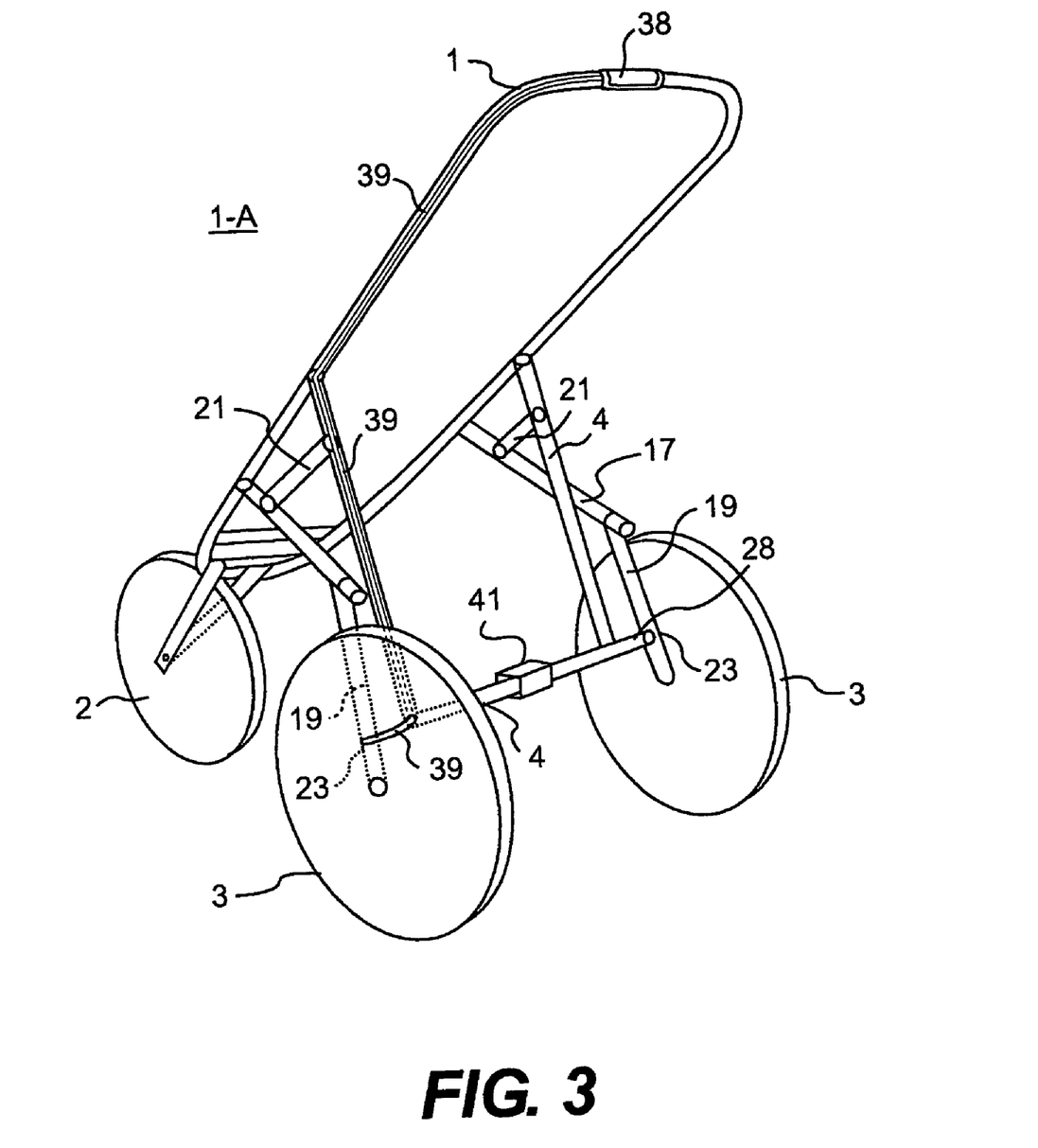
FIG. 3 is a rear elevational perspective of the stroller in an operative position.

Referring to the drawings, FIGS. 1, 2 and 3 show a carrier device, generally denoted as 1-A (for reference, the carrier device 1-A is shown in a completely stowed position in FIG. 2). Referring to FIGS. 1 and 3 particularly, the carrier device is shown in the operative position with a pair of rear wheels (3) and a forward wheel (2). Describing the rear wheel components first, a movable rear wheel support arm (17) is pivotally mounted to the frame (1) in two locations. Two other components are mounted to the said movable rear wheel support arms (17), those components being a rear wheel pivoting axle (19), and additionally an interconnection arm (21). Rear wheel pivoting axle component (19) at one end pivots along the movable rear wheel support arm (17) and at its other termination point is the axle which travels through the center of the rear wheel (3) which provides rolling support to the device. A second rear wheel component is pivotally mounted to the frame (1), that being the pivoting (floating) rear wheel lateral axle (4). The pivoting/floating rear wheel lateral axle innovation is best shown in FIG. 3, and at its lateral extremities most remote from the frame interconnects with both of the rear wheel pivoting axles (19), by virtue of a pair of pivoting rear wheel axle connectors (23), which positively latch with rear wheel pivoting axle reception cavities (not shown here). Referring particularly to FIG. 1, the forward wheel components primarily include the forward wheel fork (6), the fixed frame forward wheel stop/brace (9), and the frame footrest (10). It is understood that a retention element or a flexible retention fabric are not shown in these figures, but that the device may include these components in actual construction.

FIG. 3 also depicts a rear frame system latch release (38) located along the rear frame handle (though any alternate location may be selected). The latch release (38) controls and manipulates either a one- or two-sided cable system that serves to release the false axle latching elements (23), which secure the rear wheel lateral axle (4) to the rear wheel pivoting axles (19). As discussed in more detail later, the carrier frame as shown in FIG. 1 may include a frame hinged connector (30) and a frame connecter latch (31), which divide a rearward frame section (32) from the forward frame section (33) which allows the frame sections to stow upon each other. The connector latch (31) lifts away from the adjacent frame section when inoperative and resiliently retains the two frame sections when in the operative status.

Referring to FIG. 2, the forward wheel is shown in its stowed position. The frame footrest (10) mounted to the stroller frame (1), includes a downwardly projecting pivot bracket (11) which may be formed from two extensions of the frame footrest (10) although any suitable arrangement may be employed to create a pivoting mount and brace for the forward wheel fork (6). In FIG. 2, the rear wheels are already in a stowed position, and the forward wheel (2) has been unlatched (and stowed) by virtue of forward wheel fork spring biased release button (8) incorporated into any suitable portion of the forward wheel fork pivot head (12). The forward wheel fork (6) includes one or more suitable lateral braces (7). Fixed frame forward wheel stop/brace (9) serves as a movement stop against which the forward wheel fork (6) and its cross braces (7) align with the stop/brace (9) when the forward wheel (2) is in the completely latched, operative position shown in the other figures. To stow the operative forward wheel (2), the forward wheel fork (6) is freed (not shown here) by virtue of the user manipulating a latch (8). The user then pivots the forward wheel (2) in its same plane, down and away from its operative position in one axis, and then the user pivots the forward wheel (2) 90° along a second axis, and once the wheel is pivoted 90° in the second axis, the user may further continue the motion of the forward wheel (2) pressing it up and under the frame until the forward wheel (2) is in a plane parallel with the stroller frame (1) adjacent to said frame (1), until said wheel lies substantially within the perimeter or profile of said frame, at which time the latch (8) causes re-latching of the forward wheel (2) and its general components, close to or substantially within the side elevational profile of the device as shown in FIG. 2. It is also noted that the forward wheel (2) when stowed in this fully latched and stowed position is prevented from fully pivoting or from general rotation as a portion of the forward wheel fork (6) and/or its cross braces (7) are trapped within the confines of a suitable portion of the forward wheel stop (9), and frame footrest (10). For the user to take the forward wheel (2), from the stowed position, the operation would be reversed by the user manipulating the latch (8) to effect release.

FIG. 2 shows a carrier device embodiment where the rear wheels stow in a sandwiched configuration, but it is appreciated that depending upon expansion of the width of the frame of the device, the same folding motion may be accomplished where the rear wheels do not sandwich or overlay each other, but each occupy a side-by-side relationship also substantially within the stowed side elevational profile of the device.

A further alternative embodiment of the rear wheel unfolding function (details not shown but reference to FIG. 3 is appropriate) causes an automatic rotational force on the two wheel arms (19) so that the pivoting of the pivoting rear wheel transverse axle (4) not only serves to lower or raise the rear wheels (3) in relation to the frame (1), but further causes the tires to both rotate into perpendicular operative position or parallel stowed position in relation to the frame (1). Though the description above discusses manual movement of the rear wheels, instead the movable rear wheel support arms (17), as explained earlier, are mechanically and automatically lowered and raised by motion of the pivoting or floating rear wheel lateral axle (4). In such an embodiment, not shown, the slowing and operational motion of the movable rear wheel support arms (17) creates a further rotational force on the rear wheel pivoting axles (19), which force in turn causes the automatic rotation of the rear wheel pivoting axles (19) either to a stowed, or an operative position. Accordingly, the rear wheels (3) automatically stow in either a sandwiched or an overlaid relationship, or in a side-by-side relationship depending on the overall width dimension of the carrier device.

FIG. 3 indicates one embodiment of a latching and releasing motion between the pivoting (or floating) rear wheel transverse axle (4) and the rear wheel pivoting axles (19). The transverse extremities of the pivoting rear wheel axle (4) includes connectors (23) which each include a spring biased latching member (28) (indicated but detail omitted) which components are received in the rear wheel pivoting axle reception cavities (25) which are a portion of the rear wheel pivoting axles (19). In one representative embodiment of the latching function (although any suitable latching mechanism may be employed), the latching member (28) includes a spring biased mechanism and a cable-based latching system. The user manipulates the hand grasp (38) which moves the cable (39) which serves to release the spring-biased latching mechanism(s)/connectors (23). Accordingly the spring biased function locks the pivoting rear wheel lateral axle (4) into the cavity (25) in the rear wheel pivoting axle (19). After manipulating the latch release (38), the user may also use a hand or foot along the rear wheel transverse axle (4), via a hand/foot grasping element (41) located thereon. The grasping element (41) assists in moving the transverse axle (4) upward and downward.

Figure 4:
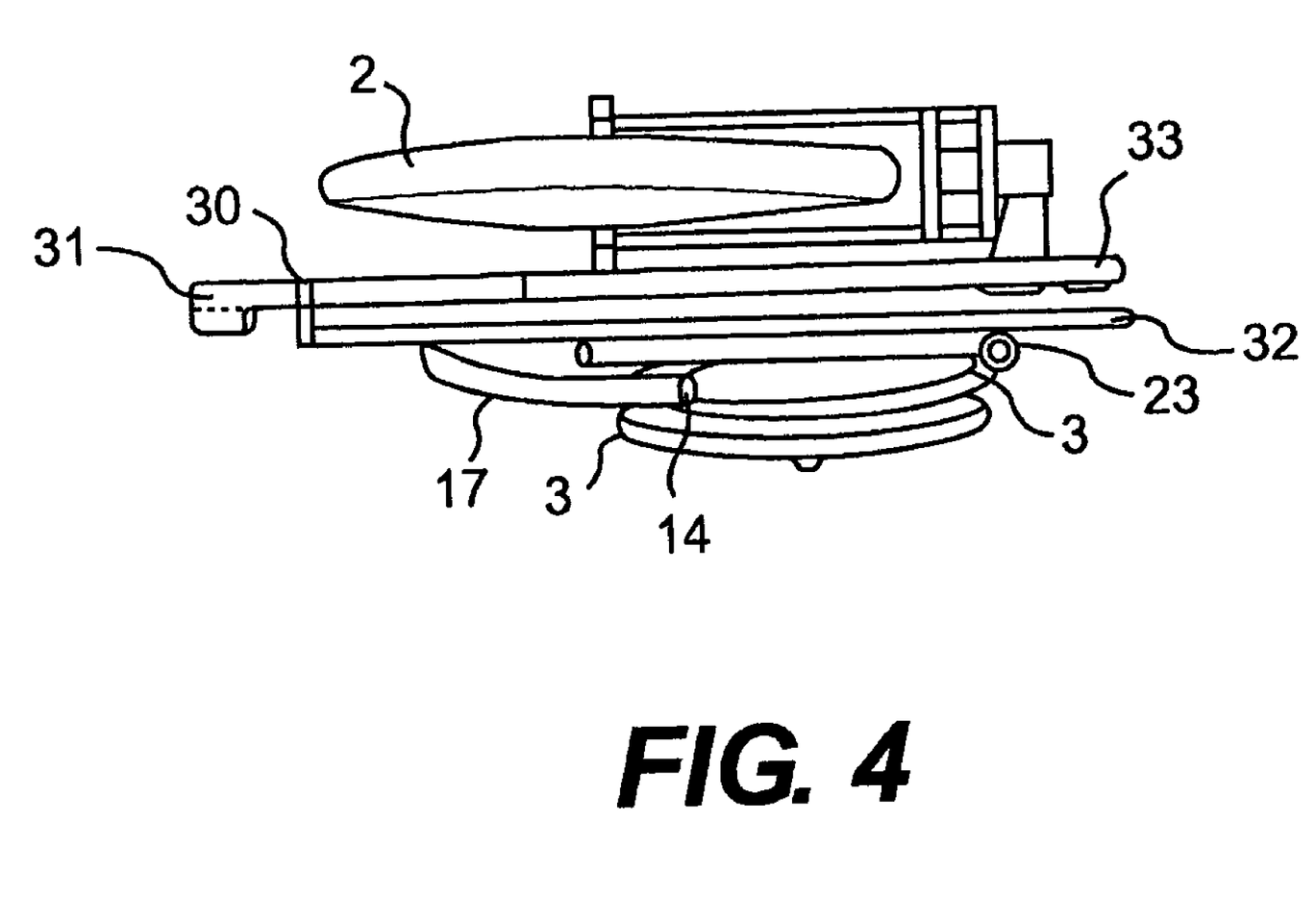
FIG. 4 is a side elevational perspective of the carrier device as shown in FIG. 2, with the difference being that the two frame sections are folded with the forward frame over the rear frame, the preferred cover figure.

Referring to FIG. 4, the carrier device frame includes a hinged, framed connector (30) and is folded nearly in half by releasing the frame connector latch (31). In the embodiment shown in FIG. 4, the forward frame section (33), along with the forward wheel (2), is folded over on top of the rear frame section (32). In this particular fold, the forward wheel (2), already stowed, is aligned above the forward frame section (33), as well as the above the rear frame section (32).

Figure 5:
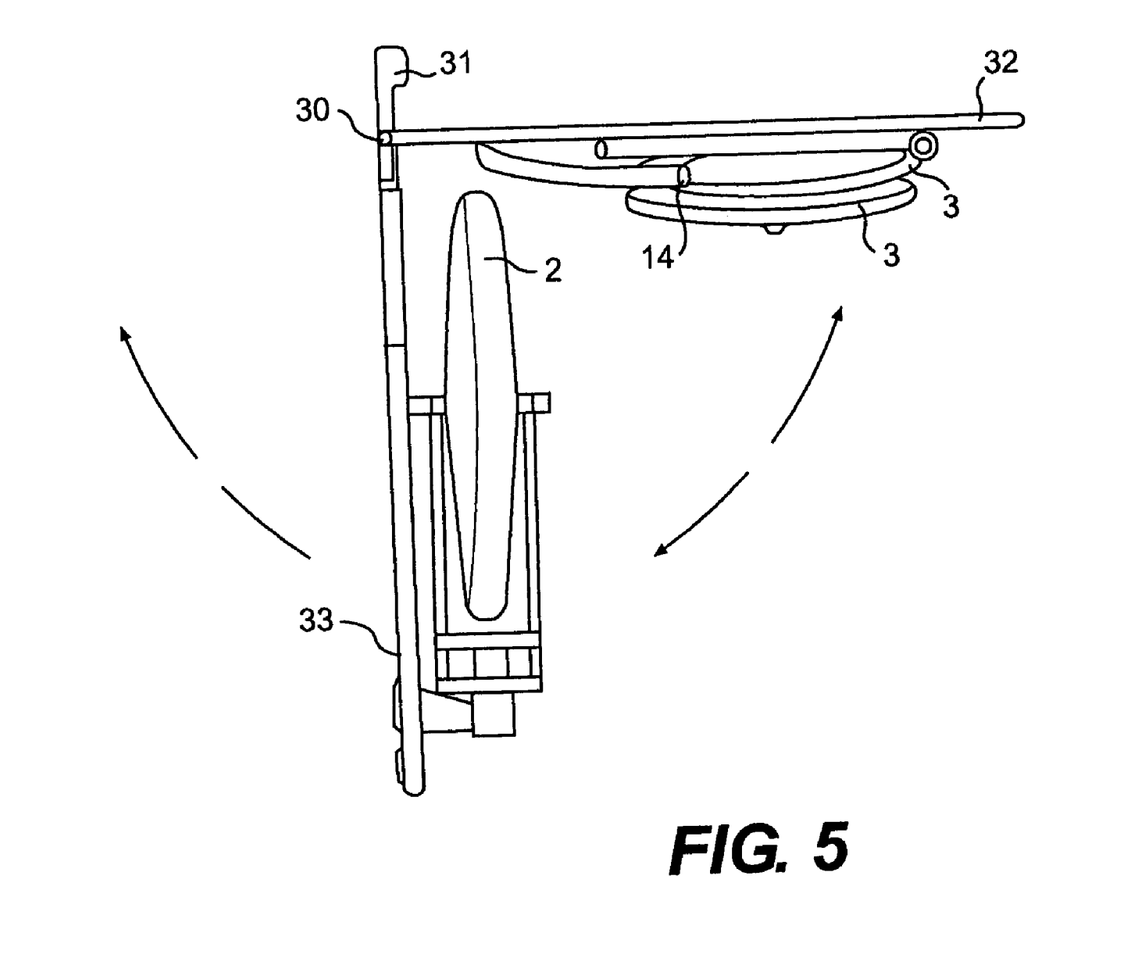
FIG. 5 is a side elevational perspective of the carrier device as shown in FIG. 3, with the difference being that the frame sections are folded at a right angle with the forward frame partly folded under the rear frame.

Referring to FIG. 5, the same carrier device with the hinged frame connector (30) as shown in FIG. 3, is shown with an alternative folding method whereby the forward frame section (33) instead folds under the rear frame section (32), and in this alternative fold method, the forward wheel, already stowed, is folded between each of the frame sections (33 and 32).

Figure 6:
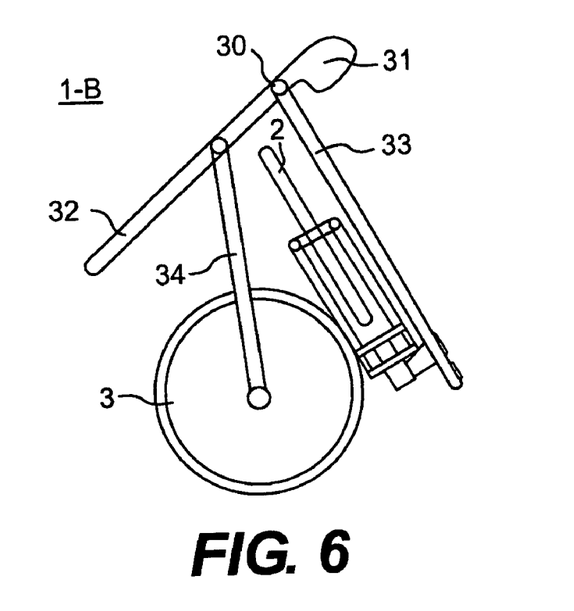
FIG. 6 is a side profile of an alternative frame design in a partially folded position.

In FIG. 6, an alternative carrier frame is shown and denoted as 1-B. This alternative carrier frame device includes forward frame section (33), the rear frame section (32), and a mid frame wheel-attaching section (34) to which two rear wheels (3) are preferably attached, with only one shown here. To the forward frame section (33), is attached a forward wheel (2) which in this figure is shown in a fully-stowed position, closely contiguous to the forward frame section (33). Although not shown, the same forward wheel (2) in an operative position, occupies the configuration as generally shown in FIG. 1. The figure also includes the frame hinge connector (30) as well as the frame connector latch (31). Although the figure shows a partially-folded configuration, when the carrier device shown in FIG. 6 is fully erected to the operative position, the forward wheel (2) is released by a latch from its stowed position to the operative position (See FIG. 1). The rearward frame section (32) is moved until it is parallel to the forward frame section (33) and then the frame connector latch (31) is moved into a latched position holding the rearward and forward frame sections in a parallel, inter-connected configuration and the device is in its operative position, with rear wheels (3) operative to the rolling surface.

Figure 7:
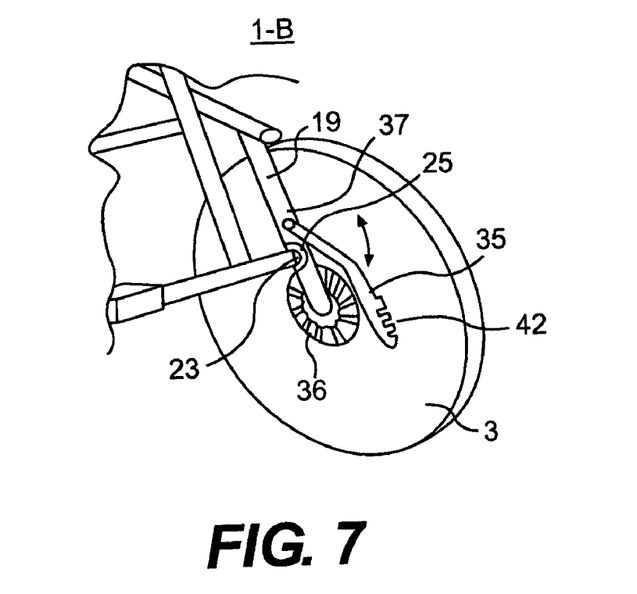
FIG. 7 is a partially broken-away section of the carrier device, including one rear wheel, focusing on the parking brake mechanism.
Figure 7A:
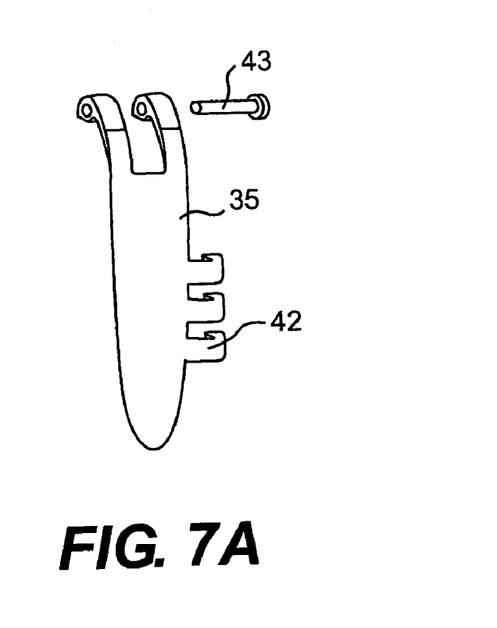

FIG. 7 focuses on a parking brake innovation. In FIG. 7, the rear wheel pivoting axle (19) includes a movable parking brake (35) which is movably mounted to a rear wheel pivoting axle (19) by virtue of a parking brake mounting element (37). Each of the rear wheels (3) may be equipped with a parking brake sprocket (36). The parking brake (35), in use, is manipulated until portions of the parking brake (35) interfit with sprocket cavities on the sprocket (36). Likewise, FIG. 7-A shows detail of one movable parking brake (35) embodiment, which is mounted to the rear wheel pivoting axle (19). 7-A shows that the parking brake (35) may be mounted to the rear wheel pivoting axle (19) via a pin (43) traveling through openings in the brake (35) as well as through a part of the pivoting axle (19). The parking brake (35) may be mounted in any suitable manner, different than as shown in FIG. 7—as it may be transverse to the pivoting axle (19) rather than generally parallel as shown, so long as the brake (35) interacts with the sprocket (36).

Although the invention has been described above in relation to preferred embodiments thereof, the invention may be applied to a wide range of miscellaneous wheeled carriers and cargo carriers which include a flexible fabric, a partial movable base, or a rigid retention element mounted to a support frame (aside from stroller devices) and any configuration of single or multiple folding forward or rear wheels, wheel support units, or wheel axle replicating arms may be combined on any such carrier devices and such devices may include several non-pivoting wheels, along with a stowable forward wheel, or may include one or more folding frame sections. Such carrier variations may include retention elements or partial bases which, in an operative position, occupy a plane parallel or close to parallel with the ground, rather than angular to the rolling surface. It will be understood by those skilled in the art that variations and modifications can be effected in these preferred embodiments without departing from the scope and spirit of the invention.

What is claimed is:

1. A wheeled carrier device, said device comprising: a support frame comprising at least two separate frame components movably inter-connected together defining a side elevational profile and an outer perimeter; and at least one retention element affixed to said support frame; and a rigid handle structure and at least one forwardmost wheel support unit and at least two rear wheel support units affixed to said support frame, each providing rolling support to said carrier device in their operative position, and each of said wheel support units including a wheel having an outer periphery and a central axis of rotation and wheel-attaching means including an arm structure, defining a plane; and said forwardmost wheel being movable between the first, operative position wherein said forwardmost wheel is erected to provide rolling support for said support frame and wherein the plane defined by said forwardmost wheel and said rear wheels extends substantially orthogonally to the side elevational profile of the support frame, and a second, stowed position of said forwardmost wheel, the plane defined by said wheel of said forwardmost wheel support unit being swept through an angle during movement of said wheel support unit between said first and second positions such that the plane defined by said wheel and its central axis of rotation in the second position of said forwardmost wheel support unit is substantially parallel with and substantially within the outer perimeter of said support frame; and releaseable latching means, for positively latching said forwardmost wheel support unit in both of said first and second positions thereof; the wheel of the at least one forwardmost wheel support unit, in the first, operative position thereof, being disposed in a plane parallel with the wheels of said rear wheel support units in their operative positions thereof, and being, in use, directed downwardly in said first, operative position thereof, and the wheel of the at least one forwardmost wheel support unit, in the second, stowed position thereof, being directed substantially toward the center of said support frame, and the at least one forwardmost wheel support unit further includes at least one bracing portion at least partly mounted to said forwardmost wheel support unit; and in a first operative position said bracing portion at least partly abuts said support frame, and in a second, stowed position at least a part of said supporting brace is detached from said abutment to said to support frame; and the at least two frame components in a first, operative position include at least one frame connector latch which latches the at least two frame components against movement in relation to each other, and in a second, non-operative position, the frame connector latch is in a disengaged status so that the separate frame components are movable in relation to each other.

2. A device in accordance with claim 1 wherein the at least one arm structure of said at least one forward wheel support unit is fixated against axial rotation in said first, operative, latched position and when unlatched from said position, said wheel and said one arm structure of the wheel support unit are rotated at least nearly 90 degrees and moved into the second, stowed position parallel with the support frame, substantially within the side elevational profile of said support frame.

3. A device in accordance with claim 1 wherein at least one part of said bracing portion is at least partly mounted along the underside of the support frame in said first position, causing gravitational force from downwardly applied weight to the retention element affixed to the support frame to maintain said first, operative position of at least one forward most wheel support unit.

4. A wheeled carrier device in accordance with claim 1 wherein the at least one arm structure mounted to said forwardmost wheel is further mounted to a pivot joint; and said joint is further mounted to said support frame; and said joint and said releaseable latch means in said first, operative position, retain said forwardmost wheel of said forwardmost wheel support unit in said operative, in use position substantially parallel with said rear wheels in their operative position; and in an intermediate position, said forward wheel support unit and said arm structure is released from said latch means and both movable on said joint along a substantially vertical plane, and rotatable along an axis of rotation of said joint at least nearly 90 degrees; and in the second, stowed position, said wheel is directed inward toward the center of said support frame.

5. A device in accordance with claim 1 wherein the forwardmost wheel, in said operative position, rotates 360 degrees in relation to at least part of the wheel attaching means arm structure.

6. A wheeled carrier device in accordance with claim 1 comprising: a transverse axle replicating unit mounted to said support frame, movable between a first, operative, position, replicating the securement of a transverse axle mounted at least near the central axis of rotation between at least two rear wheel support units providing rolling support, and a second, stowed, position wherein the components comprising said axle replicating unit are parallel with and latched substantially within the side elevational profile of said support frame; and said transverse axle replicating unit includes latching means at least near each of two ends, which latching means are latched and released by at least one latching control means; and in use, when at least two said wheels are in their operative position, and said transverse axle replicating unit is also in the first, operative position, the latching control means latch said transverse axle replicating unit between said operative wheel support units replicating a transverse axle; and whereby the transverse axle replicating unit latching control means are manipulated by the user to effect release of said transverse axle replicating unit from between said wheels and said transverse axle replicating unit is movable to said second, stowed and latched position.

7. A device in accordance with claim 6 wherein movement of the transverse axle replicating unit between said first and second positions transfers motion to said wheels of at least two wheel support units which are thereby moved from their said first operative position into said second position parallel with and substantially within the side elevational profile of said support frame of said device, and wherein reverse movement of the transverse axle replicating unit causes reverse movement of said wheels.

8. A wheeled carrier device in accordance with claim 6 wherein the transverse axle replicating unit includes at least one spring-biased latch component, and in the first, operative position of the transverse axle replicating unit, the spring-biasing causes latching of said replicating unit between said operative rear wheel support units.

9. A wheeled carrier device in accordance with claim 6 wherein user movement of the latching control means for the transverse axle replicating unit, when in said first, operative position, causes resilient retention between the latching means on each end of said transverse axle replicating unit and said operative rear wheel support units.

10. A wheeled carrier device in accordance with claim 6 wherein user manipulation of at least one slidable member located along the transverse axle replicating unit latches said unit between at least two operative rear wheel support units.

11. A wheeled carrier device in accordance with claim 6 wherein user rotational movement of the latching control means causes retention between the ends of said transverse axle replicating unit and said operative rear wheel support units.

12. A device in accordance with claim 1 wherein the latch means which latches and releases the at least one forward most wheel support unit in both said first and second positions is the same means.

13. A device in accordance with claim 1 wherein the retention element in the first, operative position forms at least one children's stroller seat that accommodates at least one child, and at least part of the support frame serves as the stroller handle.

14. A device in accordance with claim 1 wherein at least two rear wheel support units are mounted on opposite sides of said support frame, the wheels of said two wheel support units, in the second, stowed, position of said two units, being positioned in at least partially overlapping relation and being disposed at least close to being in a plane parallel with the side elevational profile of the support frame, and at least close to being within the perimeter defined by said support frame.

15. A device in accordance with claim 1 wherein said retention element in the first, operative position retains cargo.

16. A device in accordance with claim 1 wherein said retention element in the first, operative position retains at least one person.

17. A device in accordance with claim 1 further comprising a separable retention element mounted on a forward portion of said device which may be further mounted to a separate wheeled device to thereby couple the devices together for rolling movement.

18. A device in accordance with claim 1 wherein said retention element in the first, operative position retains golfing equipment.

19. A device in accordance with claim 1 wherein said retention element in the first, operative position retains hunting game.

20. A device in accordance with claim 1 wherein two separate frame sections are stacked one section above the other in the second, stowed status of the device.

21. A device in accordance with claim 1 wherein at least one braking element is movably mounted to at least one wheel support unit, and the braking element includes a first, operative position in which the braking element is moved into direct contact with a portion of shaped receptors formed at least near the axis of rotation of the wheel of the wheel support unit, preventing rolling movement of the wheel along a rolling surface, and a second, inoperative status in which the braking element is moved at least partly out of direct contact with said shaped receptors, permitting rolling movement of said wheel along said rolling surface.

22. A wheeled carrier device, said device comprising: a support frame comprising at least two separate frame components movably interconnected together defining a side elevational profile and an outer perimeter; a retention element affixed to said support frame which forms a retention surface; and a rigid handle structure and at least one forwardmost wheel support unit and at least two rear wheel support units affixed to said support frame; each of said wheel support units including a wheel having an outer periphery, defining a plane, and having a central axis of rotation, and said wheel support units each being movable between a first, operative position wherein said wheels are erected to provide rolling support for said support frame and wherein the plane defined by each of said wheels extends substantially orthogonally to the side elevational profile of the support frame, and a second, stowed position, the plane defined by said wheels and said wheel units being swept through an angle during movement of said wheel support unit between said first and second positions such that the plane defined by each of said wheels and their central axis of rotation in the second position of said wheel support units extends parallel with and substantially within the outer perimeter and side elevational profile of said support frame; and the at least two rear wheel support units further each include: at least one first, movable wheel support arm mounted to said support frame movable in a substantially vertical plane; and at least one second extremity unit is movably mounted at least partially between said first wheel support arm and the central axis of rotation of at least one wheel, said second extremity unit defining a plane; and said second extremity unit is movable between a first, latched, operative position, in which the wheel of said second extremity unit provides rolling support substantially orthogonal to said support frame and a second, stowed, latched position in which the wheel of said second extremity unit is moved at least ninety degrees in the direction toward the center of said support frame; and latching means which positively latch each said second extremity unit and said wheel in said first and second positions.

23. A device in accordance with claim 22 further including a transverse axle replicating unit mounted to said support frame including at least one interconnecting arm mounted to at least one said first movable wheel support arm; and said transverse axle replicating unit is movable between the first, operative position replicating the securement of a transverse axle mounted at least near the central axis of rotation between at least two wheels providing rolling support, and a second, stowed position wherein the components comprising said axle replicating unit are parallel with and substantially within the side elevational profile of said support frame; and said transverse axle replicating unit includes latching means at least near each end which latch said transverse axle replicating unit between at least two wheel support units when said wheel support units are in their first, operative position and when the transverse axle replicating unit is also in the first, operative position; and latching control means which both latch and release said axle replicating unit between said first, operative and second, stowed wheel support unit positions.

24. A device in accordance with claim 22 wherein movement of the transverse axle replicating unit in the direction of the first, operative position transfers motion between the at least one interconnection arm mounted between said transverse axle replicating unit and the at least one first movable wheel support arm, which motion extends at least part of said first movable wheel support arm in a substantially vertical plane away from the support frame, and reverse movement of the transverse axle replicating unit from at least near the central axis of rotation of said operative rear wheel support units, in the direction toward the support frame, causes retraction of at least part of the said first movable wheel support arm in the direction terminating substantially within the side elevational profile of said support frame.

* * * * *